(12) United States Patent
Chen et al.

(10) Patent No.: US 11,300,862 B2
(45) Date of Patent: Apr. 12, 2022

(54) WAVELENGTH CONVERSION DEVICE AND PROJECTION DEVICE

(71) Applicant: Coretronic Corporation, Hsin-Chu (TW)

(72) Inventors: I-Hua Chen, Hsin-Chu (TW); Chi-Tang Hsieh, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 100 days.

(21) Appl. No.: 16/744,113

(22) Filed: Jan. 15, 2020

(65) Prior Publication Data
US 2020/0233291 A1    Jul. 23, 2020

(30) Foreign Application Priority Data
Jan. 23, 2019   (CN) .......................... 201910061962.0

(51) Int. Cl.
*G03B 21/20*   (2006.01)

(52) U.S. Cl.
CPC ................. *G03B 21/204* (2013.01)

(58) Field of Classification Search
CPC .................................................. G03B 21/204
See application file for complete search history.

(56) References Cited

FOREIGN PATENT DOCUMENTS

| CN | 103367611 | 10/2013 |
|----|-----------|---------|
| CN | 103534824 | 1/2014 |
| CN | 105190163 | 12/2015 |
| CN | 106950617 | 7/2017 |
| CN | 107978663 | 5/2018 |
| CN | 108139520 | 6/2018 |
| CN | 209327769 | 8/2019 |
| JP | 2015211058 A * | 11/2015 |
| TW | I512385 | 12/2015 |

OTHER PUBLICATIONS

Office Action of China Counterpart Application, dated Mar. 24, 2021, pp. 1-7.
"Office Action of China Counterpart Application", dated Oct. 28, 2021, p. 1-p. 3.

* cited by examiner

*Primary Examiner* — Joseph L Williams
(74) *Attorney, Agent, or Firm* — JCIPRNET

(57) ABSTRACT

A wavelength conversion device includes a substrate, a wavelength conversion layer and a filling layer. The wavelength conversion layer is disposed on the substrate. A surface of the wavelength conversion layer away from the substrate has a plurality of pores, the filling layer is disposed on the surface of the wavelength conversion layer to fill the pores, where the filling layer is a transparent structure, and a transmittance of the filling layer to visible light is greater than or equal to 85%. A projection device having the above wavelength conversion device is also provided. The wavelength conversion device and the projection device of the invention may simplify a manufacturing process to save costs, and a yield and optical effects thereof are improved.

24 Claims, 4 Drawing Sheets

WAVELENGTH CONVERSION DEVICE AND PROJECTION DEVICE

CROSS-REFERENCE TO RELATED APPLICATION

This application claims the priority benefit of China application serial no. 201910061962.0, filed on Jan. 23, 2019. The entirety of the above-mentioned patent application is hereby incorporated by reference herein and made a part of this specification.

BACKGROUND

Technical Field

The invention relates to an optical device, and particularly relates to a wavelength conversion device and a projection device.

Description of Related Art

Projection device is a display device used for generating large-scale images, which has been continuously improved along with development and innovation of science and technology. An imaging principle of the projection device is to convert an illumination light beam generated by an illumination system into an image light beam by a light valve, and then project the image light beam onto a projection target (for example, a screen or a wall) through a projection lens to form a projection image.

Moreover, the illumination system has been evolved all along from Ultra-High-Performance (UHP) lamps and Light-Emitting Diodes (LED) to the most advanced Laser Diode (LD) light sources along with market requirements for brightness, color saturation, service life, non-toxicity and environmental protection of the projection devices. However, in the illumination system, a more cost-effective way to generate red-green light at present is to use a blue LD to emit an excitation light beam to a phosphor color wheel, where the excitation light beam excites phosphor powder of the phosphor color wheel to generate yellow green light, and then a filter element is applied to obtain the required red or green light for use.

Generally, regardless of whether the phosphor material in the phosphor color wheel is obtained through sintering of high-temperature phosphor powder mixed with glass or ceramic, the phosphor particles after sintering tend to have pores, which leads to a decrease in optical effect. However, according to the current technology, if an additional layer of glass or ceramic is sintered, although the problem of pores in the phosphor particles may be resolved, a manufacturing process thereof is complicated and costly, and a produced phosphor sheet may be warped. If an alcohol-soluble or water-soluble low-temperature inorganic adhesive is used, it must be directly attached to a heat-dissipating substrate. However, since the heat-dissipating substrate cannot withstand a too high temperature, it is unable to perform further high temperature sintering, and therefore it cannot be used.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The invention is directed to a wavelength conversion device and a projection device, which are adapted to simplify a manufacturing process to save cost, and improve a yield and optical effects.

Other objects and advantages of the invention may be further illustrated by the technical features broadly embodied and described as follows.

In order to achieve one or a portion of or all of the objects or other objects, an embodiment of the invention provides a wavelength conversion device including a substrate, a wavelength conversion layer and a filling layer. The wavelength conversion layer is disposed on the substrate. A surface of the wavelength conversion layer away from the substrate has a plurality of pores, the filling layer is disposed on the surface of the wavelength conversion layer to fill the pores, where the filling layer is a transparent structure, and a transmittance of the filling layer to visible light is greater than or equal to 85%.

In order to achieve one or a portion of or all of the objects or other objects, another embodiment of the invention provides a projection device including an illumination system, an optical engine module and a projection lens. The illumination system is configured to provide an illumination light beam. The illumination system includes at least one excitation light source and a wavelength conversion device. The at least one excitation light source is configured to provide at least one excitation light beam. The wavelength conversion device is disposed on a transmission path of the at least one excitation light beam, and includes a substrate, a wavelength conversion layer and a filling layer. The wavelength conversion layer is disposed on the substrate. A surface of the wavelength conversion layer away from the substrate has a plurality of pores. The filling layer is disposed on the surface of the wavelength conversion layer to fill the pores, where the filling layer is a transparent structure, and a transmittance of the filling layer to visible light is greater than or equal to 85%. The optical engine module is disposed on a transmission path of the illumination light beam, and is configured to convert the illumination light beam into an image light beam. The projection lens is disposed on a transmission path of the image light beam and is configured to project the image light beam.

Based on the above description, the embodiments of the invention have at least one of following advantages or effects. In the wavelength conversion device and the projection device of the invention, the filling layer is disposed on the wavelength conversion layer for filling a plurality of pores on the surface of the wavelength conversion layer located away from the substrate, such that when the excitation light beam is transmitted to the wavelength conversion device, it is uneasy to accumulate heat energy in the high transparent filling layer, and optical effects of the wavelength conversion layer are improved. Moreover, the filling layer may fill the pores without using a high-temperature process, so it has a simplified process compared to the conventional technology to save cost, and a yield is relatively improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
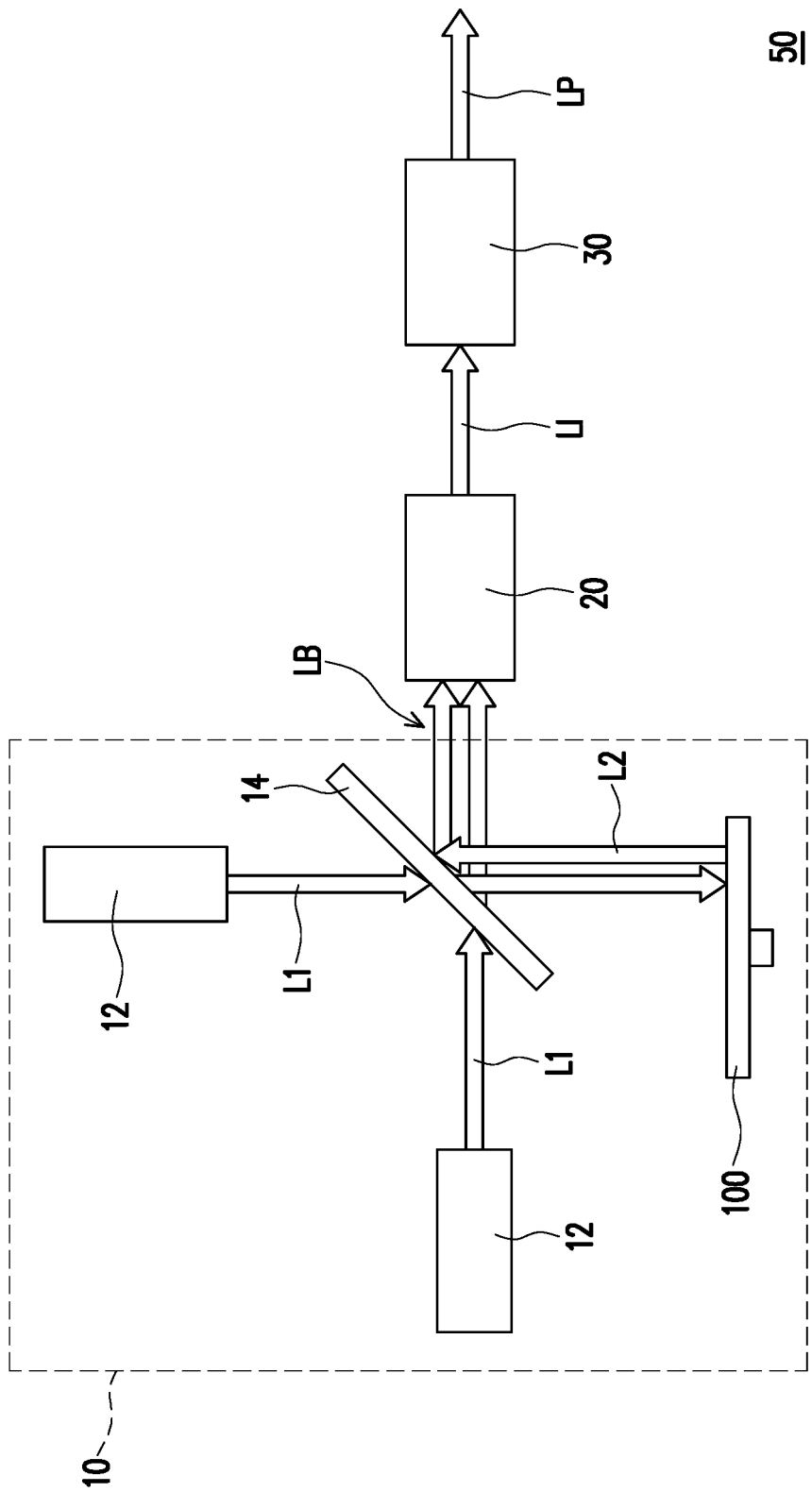
FIG. 1 is a schematic diagram of a projection device according to an embodiment of the invention.

FIG. 1 is a schematic diagram of a projection device according to an embodiment of the invention. Referring to FIG. 1, in the embodiment, the projection device 50 is used for projecting a projection light beam LP. To be specific, the projection device 50 includes an illumination system 10, an optical engine module 20 and a projection lens 30, and the illumination system 10 is configured to provide an illumination light beam LB. The optical engine module 20 is disposed on a transmission path of the illumination light beam LB, and is configured to convert the illumination light beam LB into at least one image light beam LI. The so-called illumination light beam LB refers to a light beam provided to the optical engine module 20 by the illumination system 10 at any time. The projection lens 30 is disposed on a transmission path of the image light beam LI and is configured to project the image light beam LI to form the projection light beam LP.

In detail, in the embodiment, the optical engine module 20 is, for example, a combination of at least one light valve and a light integration rod, the light valve is, for example, a reflective light modulator such as a Liquid Crystal On Silicon (LCoS) panel, a Digital Micro-mirror Device (DMD), etc. In some embodiments, the light valve may also be a transmissive light modulator such as a transparent liquid crystal panel, an electro-optical modulator, a magneto-optical modulator, an Acousto-optic Modulator (AOM), etc. The type and pattern of the light valve is not limited by the invention. Regarding the method that the light valve converts the illumination light beam LB into the image light beam LI, those skilled in the art may learn enough instructions and recommendations for detailed steps and implementation thereof from ordinary knowledge of the field, so that detailed description thereof is not repeated.

The projection lens 30, for example, includes a combination of one or a plurality of optical lenses with refractive power, for example, various combinations of non-planar lenses such as a biconcave lens, a biconvex lens, a concavo-convex lens, a convexo-concave lens, a plano-convex lens, a plano-concave lens, etc. In an embodiment, the projection lens 30 may also include a planar optical lens to project the image light beam LI coming from the light valve to a projection target in a reflective or transmissive manner. The type and pattern of the projection lens 30 is not limited by the invention.

Moreover, in some embodiments, the projection device 50 may selectively include optical elements with a light converging, refracting or reflecting functions for guiding the illumination light beam LB emitted by the illumination system 10 to the optical engine module 20, and guiding the image light beam LI emitted by the optical engine module 20 to the projection lens 30, so as to generate the projection light beam LP, though the invention is not limited thereto.

The illumination system 10 includes at least one excitation light source 12 and a wavelength conversion device 100, where the at least one excitation light source 12 is configured to provide at least one excitation light beam L1, and the wavelength conversion device 100 is disposed on a transmission path of the at least one excitation light beam L1, and is configured to convert the excitation light beam L1 into an excited light beam L2 and provide the same as a part of the illumination light beam LB. The excitation light beam L1 that is not converted into the excited light beam L2 is provided as another part of the illumination light beam LB. The excitation light source 12 may be a Laser Diode (LD) capable of emitting blue laser light. To be specific, in some embodiments, the number of the excitation light sources 12 is two, and the illumination system 10 further includes some optical elements, for example, a light splitting element 14, though in other embodiments, the number of the excitation light sources 12 may be one or more than two, and the optical element may be a reflection mirror or other optical element with a light guiding function, and the number of the optical elements may be one or plural, and the aforementioned configuration and numbers of the embodiment are only an example, and the invention is not limited thereto.

Figure 2:
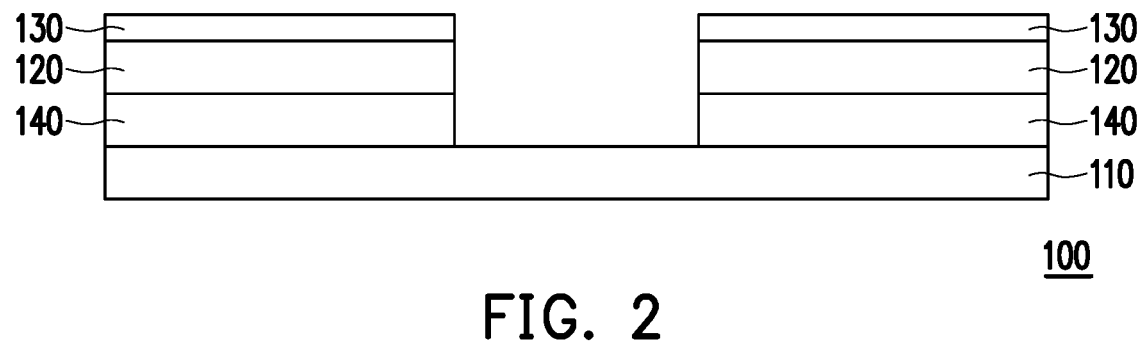
FIG. 2 is a schematic diagram of a wavelength conversion device of FIG. 1.
Figure 3:
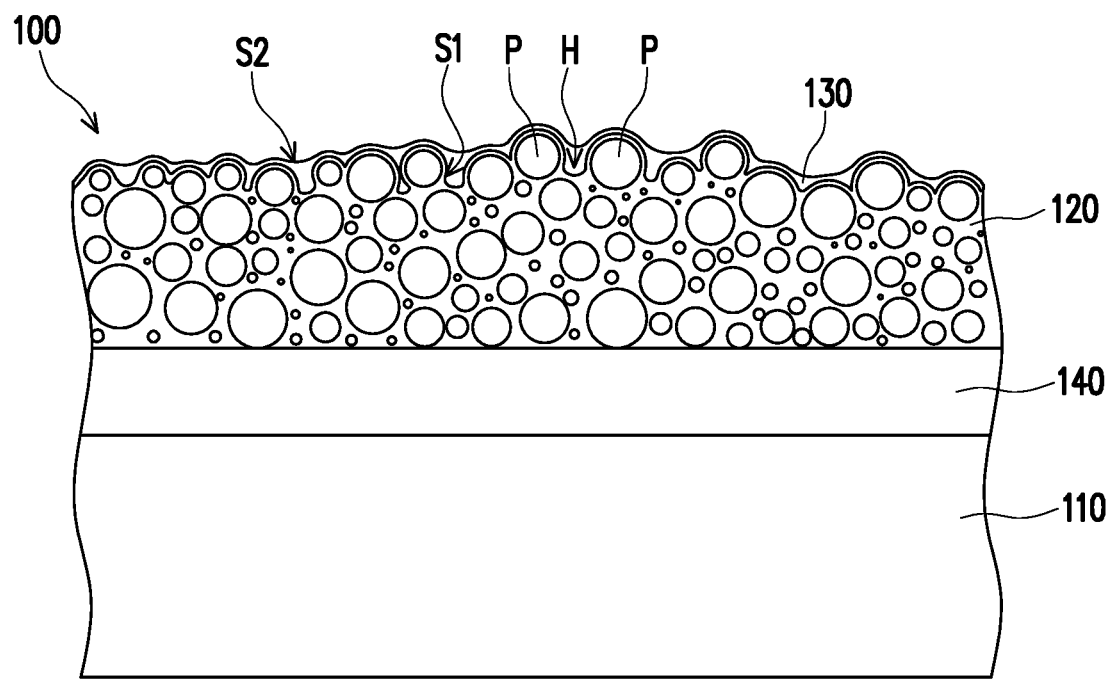
FIG. 3 is a partial enlarged view of the wavelength conversion device of FIG. 2.

FIG. 2 is a schematic diagram of a wavelength conversion device of FIG. 1. FIG. 3 is a partial enlarged view of the wavelength conversion device of FIG. 2. Referring to FIG. 2 and FIG. 3, in the embodiment, the wavelength conversion device 100 includes a substrate 110, a wavelength conversion layer 120 and a filling layer 130. To be specific, the wavelength conversion device 100 of the embodiment further includes a reflection layer 140. The substrate 110 is, for example, a heat dissipation substrate made of aluminium, aluminium alloy, copper, copper alloy, aluminium nitride or silicon carbide. The reflection layer 140 is disposed between the substrate 110 and the wavelength conversion layer 120 for reflecting light beam.

The wavelength conversion layer 120 is disposed on the substrate 110, and a surface S1 of the wavelength conversion layer 120 away from the substrate 110 has a plurality of pores H. To be specific, the wavelength conversion layer 120 has phosphor particles P with different particle sizes, so that a plurality of pores H of different sizes is generated between the adjacent phosphor particles P. In detail, the wavelength conversion layer 120 of the embodiment, for example, includes an inorganic phosphor material, and the inorganic phosphor material is formed on the substrate 110 by performing high-temperature sintering by mixing glass with phosphor, high-temperature sintering by mixing ceramic with phosphor, low-temperature sintering by mixing an alcohol-soluble inorganic adhesive with phosphor, or low-temperature sintering by mixing an aqueous inorganic adhesive with phosphor. Main components of the alcohol-soluble inorganic adhesive include a combination of siloxane and metal oxides. Main components of the aqueous inorganic adhesive include at least one of silicate, phosphate or silica sol containing silica.

In the embodiment, the excitation light source 12 is used for providing the excitation light beam L1, and the filling layer 130 of the wavelength conversion device 100 is disposed on a transmission path of the excitation light beam L1. The excitation light beam L1 first penetrates through the filling layer 130 and is transmitted to the wavelength conversion layer 120, and under the effect of the wavelength conversion layer 120, the excitation light beam L1 is converted into the excited light beam L2, and the excited light beam L2 is reflected by the reflection layer 140 to penetrates through the filling layer 130 to reach the light splitting element 14.

The filling layer 130 is disposed on the surface S1 of the wavelength conversion layer 120 to fill the pores H, where the filling layer 130 is a transparent structure, and a material of the filling layer 130 is an organic material, or the material of the filling layer 130 is a combination of the organic material and an inorganic material. In detail, in the embodiment, a transmittance of the filling layer 130 to visible light is greater than or equal to 70%, and in an exemplary embodiment, the transmittance of the filling layer 130 to visible light is greater than or equal to 85%. A refractive index of the filling layer 130 is greater than or equal to a refractive index of air, and is less than or equal to a refractive index of the wavelength conversion layer 120, and in an exemplary embodiment, the refractive index of the filling layer 130 is greater than or equal to 1.35 and less than or equal to 1.65. In this way, by configuring the filling layer 130, a penetration rate of the wavelength conversion device 100 to the visible light is increased, and the wavelength conversion device 100 may have better optical effects.

Moreover, in the embodiment, a surface S2 of the filling layer 130 away from the wavelength conversion layer 120 is non-planar, as shown in FIG. 3. In detail, in the embodiment, if the material of the filling layer 130 is the organic material, the material of the filling layer 130 includes silicone or epoxy. Conversely, if the material of the filling layer 130 is a combination of the organic material and the inorganic material, the material of the filling layer includes silicone and silica. For example, in the embodiment, the filling layer 130 may be made by mixing the inorganic silica with the silicone through a Sol-gel process, such that the filling layer 130 may have a higher temperature resistance characteristic, though the invention is not limited thereto. A thickness of the filling layer 130 is greater than or equal to 5 μm. In this way, the filling layer 130 may fill the pores H on the surface S1 of the wavelength conversion layer 120, such that when the excitation light beam is transmitted to the wavelength conversion device 100, it is not easy to accumulate heat energy in the filling layer 130 with high transmittance, and the optical effects of the wavelength conversion layer 120 are improved. Moreover, the filling layer 130 of the embodiment may fill the pores H without using a high-temperature process, so that it has a simplified process compared to the conventional technology to save costs, and the yield is relatively improved.

Figure 4:
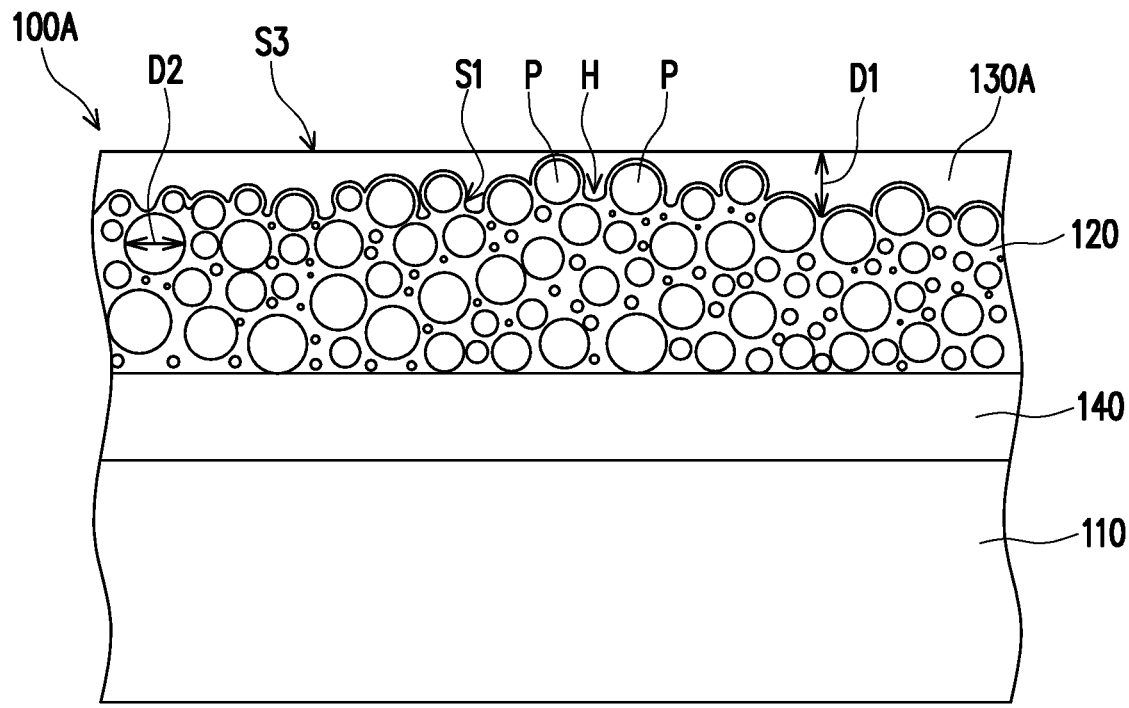
FIG. 4 is a partial enlarged view of a wavelength conversion device according to another embodiment of the invention.

FIG. 4 is a partial enlarged view of a wavelength conversion device according to another embodiment of the invention. Referring to FIG. 4, the wavelength conversion device 100A of the embodiment is similar to the wavelength conversion device 100 of FIG. 3, and a difference there between is that in the embodiment, a thickness D1 of the filling layer 130A of the wavelength conversion device 100A is greater than or equal to 0.5 times of a particle size D2 of the phosphor particles P in the wavelength conversion layer 120 and is equal to or less than 3 times of the particle size D2 of the phosphor particles P in the wavelength conversion layer 120. Moreover, in the embodiment, a surface S3 of the filling layer 130 away from the wavelength conversion layer 120 is a plane, as shown in FIG. 4. In this way, the filling layer 130A may fill the pores H on the surface S1 of the wavelength conversion layer 120, and the surface S3 of the filling layer 130A away from the wavelength conversion layer 120 is flat, so that when the excitation light beam is transmitted to the wavelength conversion device 100A, it is not easy to accumulate heat energy in the filling layer 130A with high transmittance, and the optical effects of the wavelength conversion layer 120 are improved. Moreover, the filling layer 130A of the embodiment may fill the pores H without using a high-temperature process, so that it has a simplified process compared to the conventional technology to save costs, and the yield is relatively improved.

Figure 5:
FIG. 5 is a schematic diagram of a wavelength conversion device according to another embodiment of the invention.

FIG. 5 is a schematic diagram of a wavelength conversion device according to another embodiment of the invention. Referring to FIG. 5, the wavelength conversion device 100B of the embodiment is similar to the wavelength conversion device 100 of FIG. 2. A difference there between is that in the embodiment, the substrate 110' is a transparent substrate, so that configuration of the reflection layer 140 is omitted to save the cost to achieve a transmissive wavelength conversion device 100B, though the invention is not limited thereto.

Figure 6:
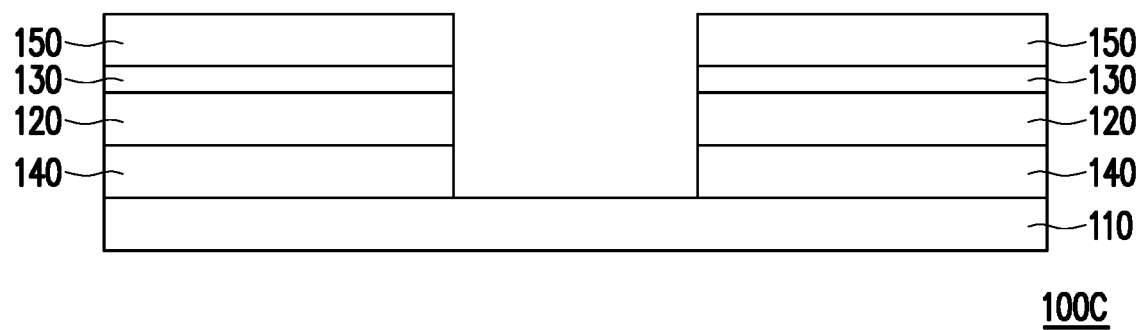
FIG. 6 is a schematic diagram of a wavelength conversion device according to another embodiment of the invention.

FIG. 6 is a schematic diagram of a wavelength conversion device according to another embodiment of the invention. Referring to FIG. 6, the wavelength conversion device 100C of the embodiment is similar to the wavelength conversion device 100 of FIG. 2. A difference there between is that in the embodiment, the wavelength conversion device 100C further includes an anti-reflection layer 150 disposed on the filling layer 130, and the filling layer 130 is located between the wavelength conversion layer 120 and the anti-reflection layer 150. Since the filling layer 130 fills the ports H on the surface S1 of the wavelength conversion layer 120, it prevents a plating material of the anti-reflection layer 150 from infiltrating into the pores H to cause inability to form the anti-reflection layer 150. In the embodiment, a luminance of the projection device 50 using the wavelength conversion device 100C configured with the anti-reflection layer 150 is increased by about 2% to 3% as compared with a luminance of the projection device 50 using the wavelength conversion device 100 without configuring the anti-reflection layer 150. However, in the conventional technology, the luminance of the projection device using the wavelength conversion device configured with the anti-reflection layer 150 and without configuring the filling layer 130 is decreased by about 1% to 2% as compared with the luminance of the projection device using the wavelength conversion device without configuring the anti-reflection layer 150 and the filling layer 130. Therefore, the wavelength conversion device 100C of the embodiment may further increase the luminance of the projection device 50. Moreover, in another embodiment, under the framework of the wavelength conversion device 100C of FIG. 6, the filling layer 130A of the wavelength conversion device 100A of FIG. 4 may also be used to replace the filling layer 130, and since the surface S3 of the filling layer 130A away from the wavelength conversion layer 120 is a plane, when the plating material of the anti-reflection layer 150 is attached to the surface S3, scattering or diffusion generated by the phosphor particles P may be further reduced, so that the luminance of the projection device 50 using the wavelength conversion device 100C may be further enhanced.

In summary, the embodiments of the invention have at least one of following advantages or effects. In the wavelength conversion device and the projection device of the invention, the filling layer is disposed on the wavelength conversion layer for filling a plurality of pores on the surface of the wavelength conversion layer located away from the substrate, such that when the excitation light beam is transmitted to the wavelength conversion device, it is uneasy to accumulate heat energy in the high transparent filling layer, and an optical effect of the wavelength conversion layer is improved. Moreover, the filling layer may fill the pores without using a high-temperature process, so it has a simplified process compared to the conventional technology to save cost, and a yield is relatively improved. Moreover, when the filling layer is further configured with an anti-reflection layer, the luminance of the projection device using the wavelength conversion device configured with the filling layer and the anti-reflection layer is further enhanced.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A wavelength conversion device, comprising:
a substrate;
a wavelength conversion layer, disposed on the substrate, wherein a surface of the wavelength conversion layer away from the substrate has a plurality of pores; and
a filling layer, disposed on the surface of the wavelength conversion layer to fill the pores, wherein the filling layer is a transparent structure, and a transmittance of the filling layer to visible light is greater than or equal to 85%,
wherein the filling layer has a plurality of unequal thicknesses, and the wavelength conversion layer is configured to receive an excitation light beam penetrated through the filling layer, and wherein the wavelength conversion layer comprises one of an alcohol-soluble inorganic adhesive mixing with phosphor particles by sintering and an aqueous inorganic adhesive mixing with phosphor particles by sintering, and at least one material of the filling layer is different from one of the alcohol-soluble inorganic adhesive and the aqueous inorganic adhesive.

2. The wavelength conversion device according to claim 1, wherein a material of the filling layer is an organic material, or the material of the filling layer is a combination of the organic material and an inorganic material.

3. The wavelength conversion device according to claim 2, wherein when the material of the filling layer is the organic material, the material of the filling layer comprises silicone or epoxy.

4. The wavelength conversion device according to claim 2, wherein when the material of the filling layer is the combination of the organic material and the inorganic material, the material of the filling layer comprises silicone and silica.

5. The wavelength conversion device according to claim 1, wherein a refractive index of the filling layer is greater than or equal to a refractive index of air, and is less than or equal to a refractive index of the wavelength conversion layer.

6. The wavelength conversion device according to claim 1, wherein a refractive index of the filling layer is greater than or equal to 1.35 and less than or equal to 1.65.

7. The wavelength conversion device according to claim 1, wherein a surface of the filling layer away from the wavelength conversion layer is non-planar.

8. The wavelength conversion device according to claim 1, wherein a surface of the filling layer away from the wavelength conversion layer is planar.

9. The wavelength conversion device according to claim 1, wherein a minimum thickness of the filling layer is greater than or equal to 5 μm.

10. The wavelength conversion device according to claim 1, wherein the wavelength conversion layer has the phosphor particles, and the plurality of unequal thicknesses of the filling layer is within a range of greater than or equal to 0.5 times of a particle size of the phosphor particles in the wavelength conversion layer and less than or equal to 3 times of the particle size of the phosphor particles in the wavelength conversion layer.

11. The wavelength conversion device according to claim 1, further comprising:
a reflection layer, disposed between the substrate and the wavelength conversion layer.

12. The wavelength conversion device according to claim 1, further comprising:
an anti-reflection layer, disposed on the filling layer, wherein the filling layer is located between the wavelength conversion layer and the anti-reflection layer.

13. A projection device, comprising:
an illumination system, configured to provide an illumination light beam, and comprising:
at least one excitation light source, configured to provide at least one excitation light beam; and
a wavelength conversion device, disposed on a transmission path of the at least one excitation light beam, and comprising:
a substrate;
a wavelength conversion layer, disposed on the substrate, wherein a surface of the wavelength conversion layer away from the substrate has a plurality of pores; and
a filling layer, disposed on the surface of the wavelength conversion layer to fill the pores, wherein the filling layer is a transparent structure, and a transmittance of the filling layer to visible light is greater than or equal to 85%, wherein the filling layer has a plurality of unequal thicknesses, and the wavelength conversion layer is configured to receive an excitation light beam penetrated through the filling layer, and wherein the wavelength conversion layer comprises one of an alcohol-soluble inorganic adhesive mixing with phosphor particles by sintering and an aqueous inorganic adhesive mixing with phosphor particles by sintering, and at least one material of the filling layer is different from one of the alcohol-soluble inorganic adhesive and the aqueous inorganic adhesive; and
an optical engine module, disposed on a transmission path of the illumination light beam, and configured to convert the illumination light beam into an image light beam; and
a projection lens, disposed on a transmission path of the image light beam and configured to project the image light beam.

14. The projection device according to claim 13, wherein a material of the filling layer is an organic material, or the material of the filling layer is a combination of the organic material and an inorganic material.

15. The projection device according to claim 14, wherein when the material of the filling layer is the organic material, the material of the filling layer comprises silicone or epoxy.

16. The projection device according to claim 14, wherein when the material of the filling layer is the combination of the organic material and the inorganic material, the material of the filling layer comprises silicone and silica.

17. The projection device according to claim 13, wherein a refractive index of the filling layer is greater than or equal to a refractive index of air, and is less than or equal to a refractive index of the wavelength conversion layer.

18. The projection device according to claim 13, wherein a refractive index of the filling layer is greater than or equal to 1.35 and less than or equal to 1.65.

19. The projection device according to claim 13, wherein a surface of the filling layer away from the wavelength conversion layer is non-planar.

20. The projection device according to claim 13, wherein a surface of the filling layer away from the wavelength conversion layer is planar.

21. The projection device according to claim 13, wherein a minimum thickness of the filling layer is greater than or equal to 5 μm.

22. The projection device according to claim 13, wherein the wavelength conversion layer has the phosphor particles, and the plurality of unequal thicknesses of the filling layer is within a range of greater than or equal to 0.5 times of a particle size of the phosphor particles in the wavelength conversion layer and less than or equal to 3 times of the particle size of the phosphor particles in the wavelength conversion layer.

23. The projection device according to claim 13, wherein the wavelength conversion device further comprises a reflection layer disposed between the substrate and the wavelength conversion layer.

24. The projection device according to claim 13, wherein the wavelength conversion device further comprises an anti-reflection layer disposed on the filling layer, and the filling layer is located between the wavelength conversion layer and the anti-reflection layer.

* * * * *